United States Patent [19]

Riehle

[11] 4,174,777

[45] Nov. 20, 1979

[54] ZERO PRESSURE ACCUMULATING CONVEYOR AND METHOD

[75] Inventor: Frederick W. Riehle, Jeffersonville, Ind.

[73] Assignee: A-T-O Inc., Willoughby, Ohio

[21] Appl. No.: 881,123

[22] Filed: Feb. 24, 1978

[51] Int. Cl.² ......................................... B65G 13/071
[52] U.S. Cl. ...................... 198/781; 198/790
[58] Field of Search .................... 198/781, 789, 790

[56] References Cited

U.S. PATENT DOCUMENTS

| | | | |
|---|---|---|---|
| 1,430,766 | 10/1922 | Stebler | 193/35 A X |
| 1,900,150 | 3/1933 | Anderson | 198/781 X |
| 2,194,219 | 3/1940 | Eggleston | 198/789 |
| 3,180,480 | 4/1965 | Preston | 198/790 |
| 3,232,415 | 2/1966 | Gotham | 198/781 |
| 3,601,247 | 8/1971 | Lowrie | 198/781 |
| 3,616,894 | 11/1971 | Koennecke et al. | 198/781 |
| 3,621,982 | 11/1971 | Fleischauer et al. | 198/781 |
| 3,627,092 | 12/1971 | Fleischauer et al. | 198/781 X |
| 3,696,912 | 10/1972 | Fleischauer et al. | 198/781 |
| 3,718,248 | 2/1973 | Muller | 198/781 |
| 3,724,642 | 4/1973 | De Good | 198/781 |
| 3,768,630 | 10/1973 | Inwood et al. | 198/781 |
| 3,770,102 | 11/1973 | De Good | 198/781 |
| 3,840,110 | 10/1974 | Molt et al. | 198/781 |
| 3,900,097 | 8/1975 | De Courcy | 198/781 |
| 4,006,815 | 2/1977 | Werntz | 198/781 |
| 4,096,942 | 6/1978 | Shepherd | 198/790 X |
| 4,108,303 | 8/1978 | Vogt et al. | 198/781 |

Primary Examiner—James L. Rowland
Attorney, Agent, or Firm—Wood, Herron & Evans

[57] ABSTRACT

A zero pressure accumulating conveyor is provided from a standard belt driven live roller section and "bolt-on" accumulating elements. The accumulator includes a plurality of accumulation zones, each zone having an article sensing apparatus and frictional braking apparatus for braking at least one roller, and preferably less than all rollers, in the zone. Each sensing apparatus includes a first valve, actuated in response to an article in the respective zone for pressurizing the brake apparatus. All zones, except the downstream-most zone, have second valves. The second valves, in a respective zone, are opened in response to actuation of the first valve, in the immediate downstream zone, for passing the pressurized air from the first valve in the respective zone to the brake apparatus in the respective zone only when an article is sensed in the immediate downstream zone, and a subsequent article is sensed in the respective zone. The drive belt is in direct continuous engagement with the rollers, even during operation of the braking apparatus. The valves, the sensing apparatus, and the braking apparatus are attached to a standard belt driven live roller conveyor by means of brackets, while a common pressurized air manifold is attached to the conveyor by a clip. Conveying methods are included.

26 Claims, 11 Drawing Figures

ZERO PRESSURE ACCUMULATING CONVEYOR AND METHOD

This invention relates to accumulator conveyors, and more particularly to zero pressure accumulator conveyors.

Accumulator conveyors of the zero pressure type are known in the art as having the capability to accumulate a number of articles in various accumulator zones such that the articles don't touch each other. This is in contrast to many typical accumulator conveyors which don't have this feature, the accumulated articles abutting, and exerting pressure on each other. Thus, the term "zero pressure" is applied to those conveyors on which articles are accumulated in non-abutting or pressureless disposition vis-a-vis each other.

Most accumulator conveyors and, indeed, the known zero pressure accumulator conveyors, are generally more complex and substantially more expensive than, for example, a similar length of simple powered conveyor which does not have an accumulate capability. This complexity and expense is a result of the zero pressure accumulator's need, for example, of separate article sensing and drive mechanisms for each accumulator zone.

In the conveyor field, it is typical to provide standard conveyor sections which can be adapted for many conveying needs. For example, to move articles of known weight and dimension from one point to another, it is common to supply the necessary number of powered conveyor sections to span the distance, and these sections can be drawn from standard stock inventory without special engineering or modification.

When accumulation is desired within the conveying line, however, it is also necessary to utilize entirely different accumulator conveyor sections. It has not heretofore been practical to adapt the standard conveyor section to an accumulate function and much less to a zero pressure accumulate function. Rather, significantly more complex and expensive accumulator sections are required.

It has thus been one objective of this invention to provide means for producing an improved zero pressure accumulator conveyor with simple, low-cost additions to existing standard conveyors.

A further problem in the accumulator conveyor field is that when it is desired to positively brake the accumulator, it is generally necessary to disengage the conveyor's drive mechanism. For example, while accumulator conveyor brakes are known, such as in U.S. Pat. Nos. 3,601,247; 3,616,894; 3,724,642; 3,770,102; and 3,840,110, each requires disengagement of the drive mechanism during braking. Thus, many accumulators have heretofore required drive mechanisms which require disengagement in order for accumulation to take place. If positive braking is also desired, extra separate mechanisms for braking are required. One form of accumulator conveyor which do not require drive disconnection are also known such as, for example, the conveyor described in U.S. Pat. No. 3,621,982. In that device, each roller is driven via an independent belt. Also, upstream zones are braked solely in response to the condition of a downstream zone, and without regard to the condition of the upstream zone vis-a-vis articles thereon. Thus unnecessary braking place, and space on the conveyor is wasted since a braked zone may have no accumulated articles thereon.

In many installations, space is at a premium. While zero-pressure accumulation is desired, it is also desired that the articles be closely accumulated to save space, i.e. that at least one article reside in each zone before it is braked and further articles are prevented from being conveyed into it. Thus, a desirable feature in a zero pressure accumulator conveyor is that the highest number of articles possible can be accumulated in a particular length of conveyor line.

A further disadvantage of the conveyor shown in U.S. Pat. No. 3,621,982 is that braking is mechanically accomplished by the force exerted on a lever arm by a conveyed article. In the case of light articles or low conveying pressure, this mechanical actuation may lead to operational difficulties, the force exerted not being sufficient for adequate braking.

It has accordingly been a further objective of this invention to provide an improved accumulator conveyor.

A further objective of the invention has been to provide an improved zero pressure accumulator conveyor.

A further objective of the invention has been to provide an improved accumulator conveyor which is braked without disengagement of the conveyor drive.

A still further objective of the invention has been to provide an improved zero pressure accumulator conveyor which accumulates articles without disengagement of the conveyor drive and while said drive is operatively running.

A further objective of the invention has been to provide an improved accumulator conveyor where each accumulation zone is placed into accumulate mode in response at least to an article in the zone.

A further objective of the invention has been to provide an improved zero pressure accumulator conveyor capable of operating with a broad range of article weights and drive forces, and without requiring significant mechanical advantages exerted by the conveyed article for mechanically actuating the brake.

To these ends, a preferred embodiment of the present invention includes a standard belt driven live roller conveyor provided with a plurality of accumulator zones. Each zone has several rollers, at least one of which, and less than all, is selectively braked under a pre-set accumulator condition to stop an article in the zone while the drive belt continues to slide under the braked roller, and to slide under or to drive the non-braked rollers, whereby the article is nevertheless stopped in the zone and is spaced from other articles on the conveyor. The downstream-most zone is actuated to accumulate in response to an article thereon. All other upstream zones, however, are actuated to accumulate only when the immediate downstream zone is accumulating or stopped and when an article is sensed in the next zone to be braked.

More particularly, each zone has an article sensing apparatus and a brake operatively associated with at least one and preferably two rollers therein. The downstream most zone has a first air valve which is actuated by an article in the zone to pressurize an air cylinder in the zone and engage the brake. The first valve also has an output connected to control a valve in the next upstream zone.

The remaining upstream zones have two air valves. A first valve is connected to an article sensing machanism for opening the valve when an article is sensed in the zone. A second valve is operated between open and closed positions by the first valve in the immediately downstream zone. The second valve is moved from a closed to an open position when the first valve in the downstream zone is opened by virtue of an article being sensed in that zone. This second valve is connected between the first valve in its own zone and a brake actuating air cylinder to actuate the air cylinder and thus engage the brake with the rollers in its zone. Thus, once the second valve is opened by virtue of an article in the downstream zone, it can pass pressurized air from the opened first valve in its own zone to the brake cylinder for braking an article in its own zone.

Accordingly, the brake in all but the downstream-most zone is actuated in response to two conditions:

(a) when an article is sensed in the downstream zone and the first valve in that zone is opened and moves the second valve, in the immediate upstream zone to be braked to an open position; and (b) when an article is sensed in the immediate upstream zone to be braked, thereby opening the first valve therein to pass pressurized air from a manifold, common to all zones, therethrough and through the opened second valve to the brake actuating cylinder in the zone.

Thus, when accumulating, the improved conveyor wastes no space, and no upstream zone is stopped unless the downstream zone is stopped and an article is in the upstream zone. There are no dead zones with no articles, and the conveyor is capable of singulating articles passing through it.

The downstream-most zone is actuated to accumulate when an article is sensed thereon. Alternately, that article could be stopped in a sensed position as a result of many things, for example, a downstream jam, a stop bar, a stopped brake conveyor immediately downstream, or by other operational features of the conveyor system.

I have found that the positive braking of one and preferably two rollers in a zone, for example, is sufficient to stop an article thereon, even though the article is also supported by other driven rollers which are not engaged by the brake. These other rollers may continue to be driven by the belt or, preferably, they may be stopped by the accumulated article.

Further in the preferred embodiment, the zero-pressure accumulating conveyor can be provided by simple modifications to existing standard conveyor sections. Thus, accumulator kits can be provided to those users already having standard sections and who desire an accumulation capability, or accumulator sections can be provided from in-stock standard conveyor sections, with only simple equipment additions.

More particularly, the apparatus of a preferred embodiment of the invention is easily assembled to existing standard conveyor sections of the belt driven live roller type. In one form of such standard conveyor, side frames or channels are pre-punched for roller shaft holes on very short centers, both for article carrying rollers and for belt tensioning rollers lying beneath the article carrying rollers to hold the drive belt thereagainst. More holes than are actually needed are punched in order to provide a universal side frame for use in varying applications requiring different roller centers. In most cases, all these pre-punched holes are not used for roller shafts and the unused holes are used, according to this invention, for mounting the braking and the sensing apparatus of the present invention without significant structural modification to the standard conveyor section itself. The simplicity of both sensing and braking apparatus disclosed herein provides simple "bolt-on" modifications to standard conveyor sections to produce an improved zero pressure accumulator.

The control and brake actuation is provided by a pressurized air system including a common manifold along the conveyor and connector conduits and the like which are also easily mounted onto the standard conveyor sections as by simple fasteners such as spring clips and the like. Sincce no special accumulator sections are thus required, cost is significantly reduced and zero pressure accumulation capability is easily and inexpensively acquired. Standard sections now in use can also be easily adapted to accumulate articles in a zero-pressure mode.

These and other objects and advantages will become more readily apparent from the following detailed description and from the drawings in which:

Figure 1:
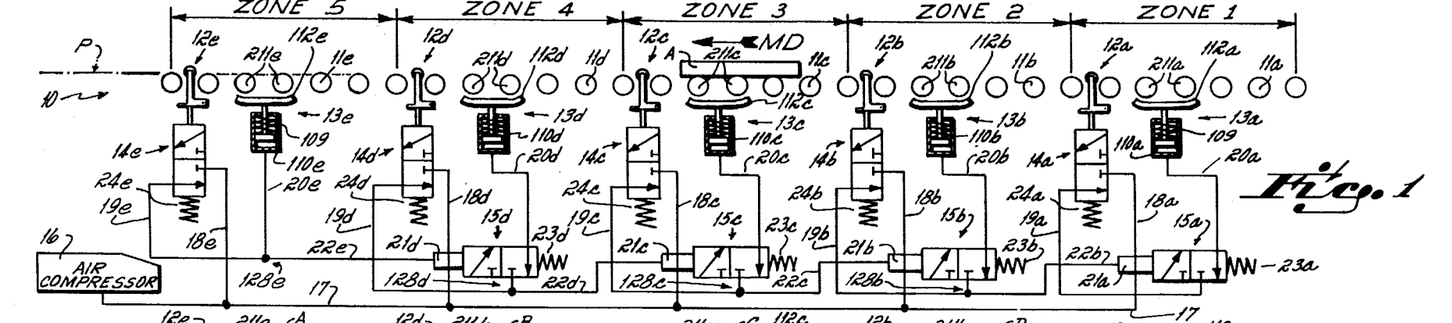
FIGS. 1-3 are diagrams of the present invention illustrating its features and operation.
Figure 2:
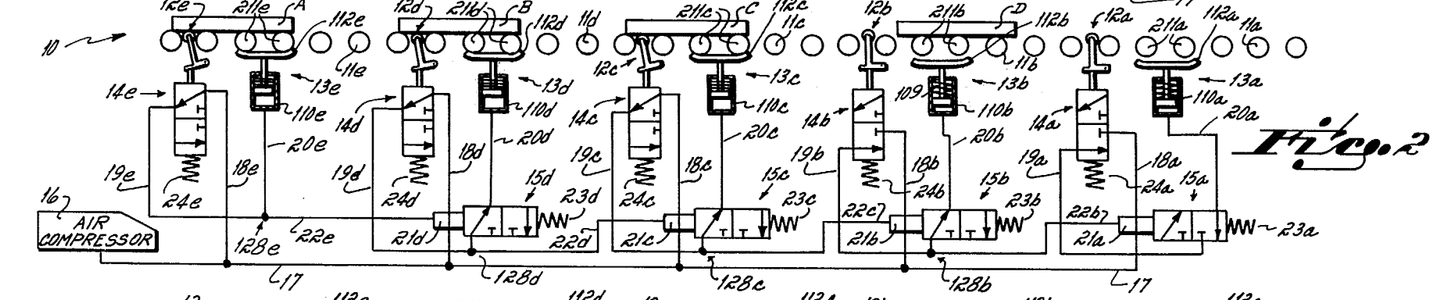
Figure 3:
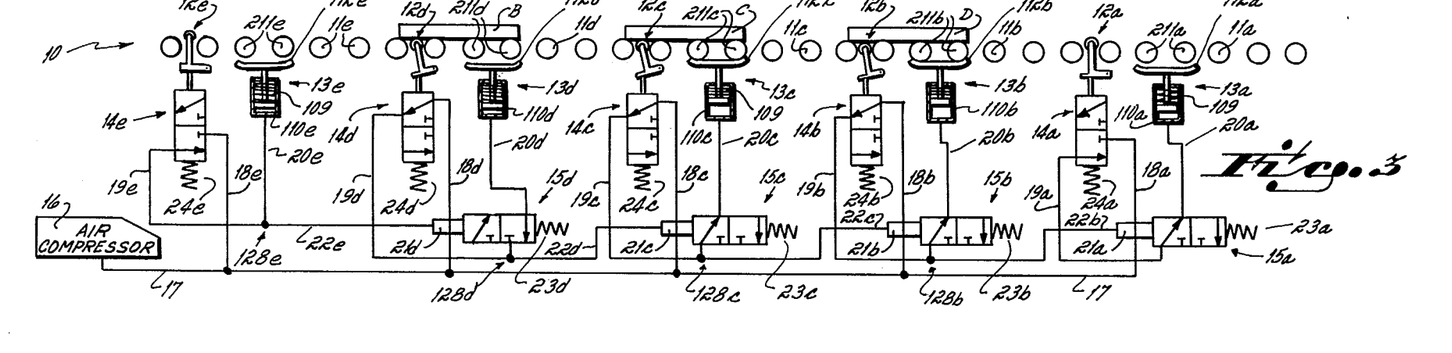
Figure 4:
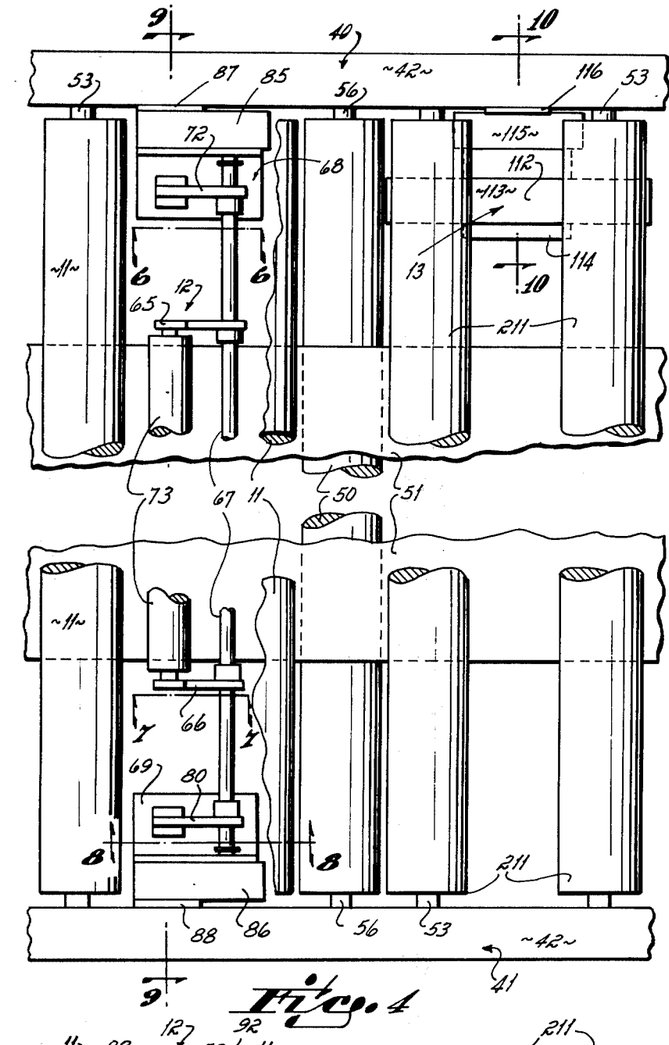
FIG. 4 is a plan view of the present invention showing the relationship of the drive belt, sensing apparatus and brake apparatus.
Figure 5:
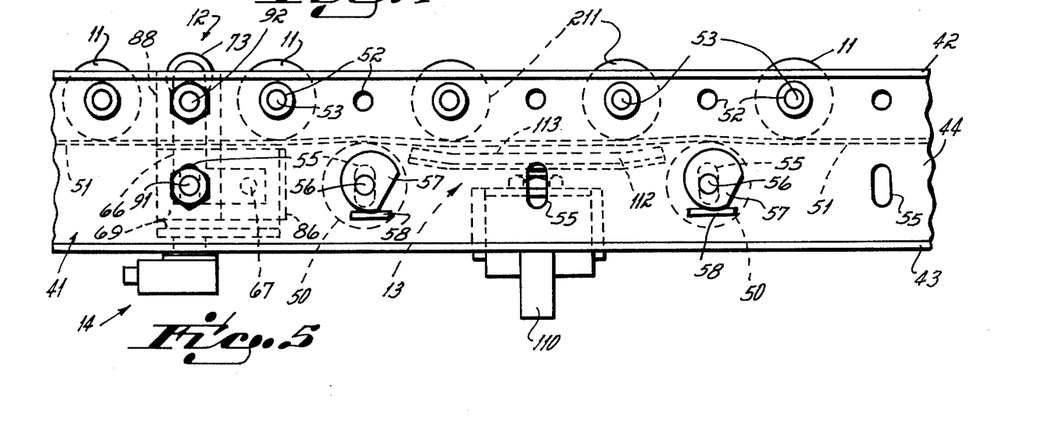
FIG. 5 is an elevational view of the invention in FIG. 4.
Figure 6:
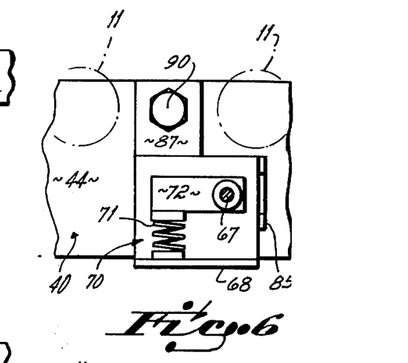
FIG. 6 is a cross-sectional view taken along lines 6—6 of FIG. 4.
Figure 7:
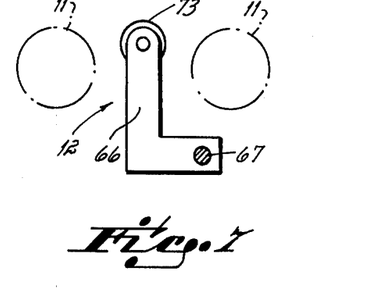
FIG. 7 is a cross-sectional view taken along lines 7—7 of FIG. 4.
Figure 9:
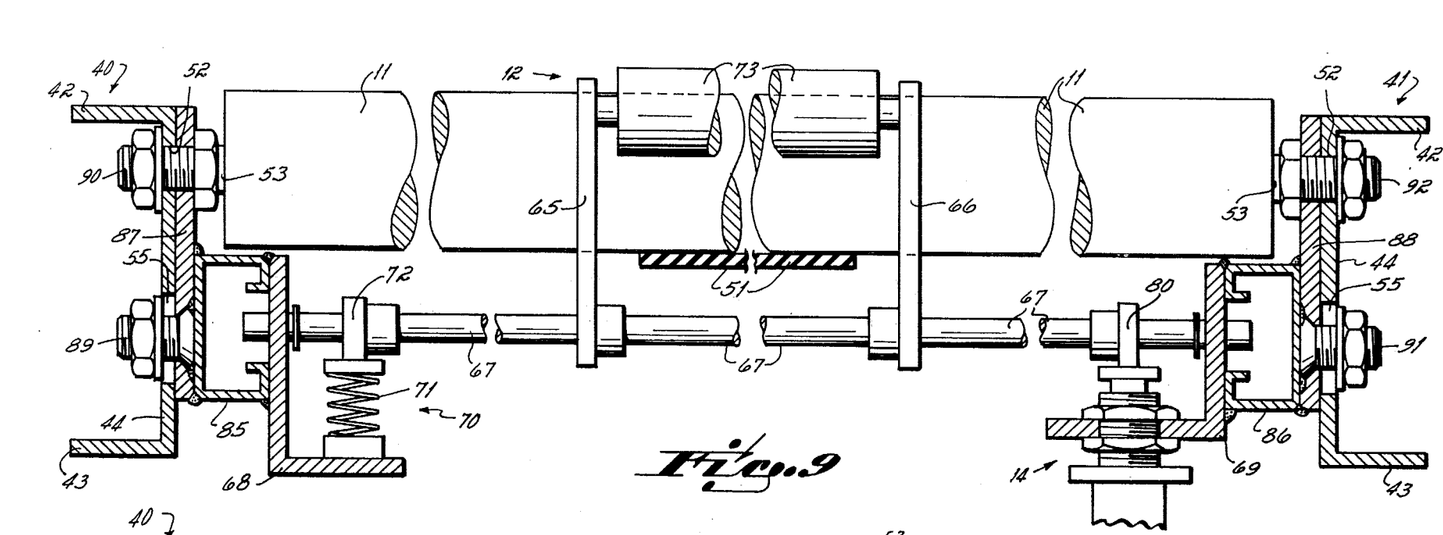
FIG. 9 is a cross-sectional view taken along lines 9—9 of FIG. 4.

Turning now to the drawings, and particularly FIGS. 1-3 thereof, the present invention contemplates a zero pressure accumulator conveyor 10 of the belt driven live roller type. For the purpose of clarity of illustration, the belt driving features of the conveyor 10 are not shown in FIGS. 1-3, but are shown in FIGS. 4, 5 and 9.

The conveyor 10 is divided into a plurality of accumulation zones 1-5, as illustrated in FIG. 1. With specific exceptions in zone 5, as will be discussed, each of the zones is provided with similar apparatus, which will be hereinafter designated with like numbers utilizing suffix letters a-e, respectively, in order to differentiate the similar apparatus utilized in each zone. Each zone is provided with a plurality of belt driven live rollers 11, which have cylindrical surfaces defining an article carrying plane P for carrying articles A-D, as shown in the figures. For clarity and as will be described, rollers in each zone which are positively braked are identical to rollers 11, however, they will be identified with the number 211. Each zone is also provided with an article sensing apparatus 12, brake apparatus 13, and a first two position air switch or valve 14. With the exception of zone 5, each zone is provided with a two-position second air valve 15 having pneumatic control means for actuating it from a normally closed to an open position.

A source of pressurized air, such as air compressor 16, is connected to supply a common manifold 17, which runs the length of the conveyor 10. The air pressure requirements of the invention are relatively small so that a relatively small air compressor of any suitable form can be used. Preferably, it is desirable simply to connect a suitable air compressor to a drive output of the belt driving mechanism of the conveyor 10, the power requirements for the compressor not being sufficiently large to change the operating capabilities of the conveyor 10. Alternately, of course, a separate source of pressurized air can be utilized to supply manifold 17.

The manifold 17 is connected as shown in FIGS. 1–3 to an input of the two position air valve 14 through the respective conduits 18. An output conduit 19 connects an output of each air valve 14 to the brake apparatus 13 in its same zone via conduits 19 and 20 and, in the case of zones 2 through 5 to control apparatus 21 of the second air valve 15 in the next immediate upstream zone. Thus, for example, the output of the first air valve 14e in zone 5 is connected via conduits 19e and 20e to the braking apparatus 13e, and as well through the conduit 22e to the control apparatus 21d of the second air valve 15d in zone 4.

It will be further noted that in zone 5 the connection from the output of the air valve 14e via conduits 19e and 20e to the brake apparatus 13e is a direct passageway. On the other hand, in zones 1 through 4, the output of the first air valve 14 is connected through conduit 19 to the second air valve 15, in each respective zone, and only from there through the conduit 20 to the brake device 13 in the respective zone. Thus, any output from the air valve 14 in zones 1 through 4 can only be introduced to the brake apparatus 13 in each of those zones if the second air valve 15 in that zone is moved to its open position. For example, in FIG. 1 each air valve 15 is in a closed position, being normally held there via the respective springs 23.

Turning momentarily to FIG. 2, however, it will be appreciated, for example, that second valve 15d (zone 4) has been moved to its open position via pressure in conduit 22e such that pressure in conduit 19d passes through the valve 15d and conduit 20d for energizing the brake apparatus 13d. In a somewhat similar manner, the first air valve 14 in each zone is spring loaded by the spring 24 to a closed position where the valve is ineffective to pass pressurized air from the conduit 18 through the valve to the conduits 19. It is only when the first air valves 14 are actuated by the sensing apparatus 12 that the first valves are moved to an open position such as, for example, the position of the valve 14e in FIG. 2, in order to pass pressurized air from the common manifold 17 through the conduit 18e and to the conduit 19e.

As will be appreciated, the disposition of the accumulator 10 in FIGS. 1 through 3 is such that the conveyed direction of articles A through D is in the machine direction indicated by the arrow MD in FIG. 1. Further, for the purposes of description, it should be noted that zone 5 in the conveyor 10, as illustrated in the drawings, is the downstream-most accumulation zone, while zone 1 is the upstream-most accumulation zone, the articles first arriving at zone 1 and thereafter being conveyed downstream through the zones to zone 5.

FIGS. 4 through 11 illustrate in a more detailed fashion the apparatus of the invention. In the plan view of FIG. 4, and in the elevational and cross-sectional views of FIGS. 5 and 11, it will be noted that the conveyor 10 comprises elongated side rails, frames, or channels 40 and 41, each channel having an upper flange 42, a lower flange 43 and a web portion 44. The channels are substantially parallel and rotatably support the belt driven article carrying rollers 11 and 211. Also, the channels rotatably support, beneath the rollers 11 and 211, belt tensioning rollers 50, as shown in FIGS. 4 and 5. The tensioning rollers 50 are staggered from the article carrying rollers and, as best seen in FIG. 5, are positioned to urge a drive belt 51 upwardly against the driven article carrying rollers.

In a preferred embodiment, the belt driven conveyor formed by channels 40 and 41, article carrying rollers 11 and 211, tensioning rollers 50 and common drive belt 51 comprise a standard belt driven live roller conveyor of the type sold under the mark "DIAL-A-TENSION" by the assignee of this application.

As shown, the belt directly engages surfaces of the carrying rollers 11 and 211 and continually remains in such direct contact across the entire width of the belt.

As best seen in FIG. 5, this conveyor typically includes side channels 40 and 41, which have pre-punched holes 52 for mounting the shafts 53 of the article carrying rollers 11 and 211. As noted in FIG. 5, however, it is common to utilize, for example, only alternate holes 52. Thus holes 52 may, for example, be prepunched in the channels 40 and 41 on 3 or 4 inch centers, for example, while in use only 6 or 8 inch centered rollers, respectively, are required.

In a like manner, the side channels 40 and 41 are also pre-punched with slots 55 for adjustably mounting the shafts 56 of the belt tensioning rollers 50. As shown, slots 55 are offset from the holes 52 in which the rollers 11 and 211, are mounted so that the tensioning rollers 50 are staggered and are located between the rollers 11 and 211. In addition, it will be noted that the shafts 56 of the tensioning rollers 50 are mounted in rotatable cams 57, which are supported by stops 58 diagramatically shown in FIG. 5. The cams are selectively rotatable so that when turned in a counter-clockwise direction, for example, as viewed in FIG. 5, they serve to raise the shafts 56 and, therefore, raise the belt 51 to engage the rollers 11 and 211 with more pressure. Turned clockwise, the cams 57 lower the shaft 56 and thereby reduce the pressure exerted by the belt 51 on the rollers. The stops 58 have been diagrammatically shown in FIG. 5, for the purposes of clarity, so that the position of rollers 50 may be shown. It is also useful and preferable to provide cams 57 of such size so that extra stops 58 are not required, but so that the cams reside on the bottom flange 43 of the conveyor channel. Thus, stops 58, as shown in FIG. 5, are shown only for the purposes of clarity to illustrate how the cams 57 operate.

It should be appreciated that the basic "DIAL-A-TENSION" conveyor comprising the side channels, article carrying rollers, belt tensioning rollers and belt drive is a conventional standard conveyor section where the side channels are universally prepunched and stocked. Thereafter, the sections are made up depending on the requirements of the particular job for which they are to be used. It will also be appreciated that such standard sections as are in current use can be simply modified according to this disclosure, without significant structural modifications, to provide an accumulation conveyor. The present invention provides the means by which these standard conventional conveyor sections can be modified to produce a zero pressure accumulating function. Also, it should be appreciated that the present invention can be utilized in adapting other frictionally driven forms of driven conveyors to an improved accumulate function.

Continuing now with the description of the invention, it will be noted that the belt 51 preferably comprises a common frictional drive belt for the entire conveyor 10. Of course, as shown in FIGS. 1 through 3, the conveyor 10 includes 5 zones. A single conveyor 10 may be made from one standard conveyor section, or it may be made up from a plurality of standard conveyor sections having separate or common drives. In many light duty applications, a single belt drive is used for many a long conveyor made up from a plurality of stock roller sections. Also, a conveyor 10 could include more than 5 accumulation zones such as may be desired simply by repeating the apparatus of each zone, as shown in the figures.

Turning now to the details of the accumulation apparatus, and particularly to FIGS. 4 through 11, the article sensing apparatus 12 comprises a bell crank assembly or article sensing lever arm having two crank arms 65 and 66 mounted on a spring loaded rock shaft 67, in turn mounted to respective bracket elements 68 and 69 proximate the respective side channels 40 and 41 of the conveyor 10. Keepers 67a and 67b hold the shaft 67 against undesirable movement. A spring return apparatus 70 serves to bias the rock shaft 67 in a clockwise direction, as viewed in FIGS. 5, 6 and 7, for example. The spring return means includes a spring 71, having one end mounted on the bracket 68 and a lever arm 72 mounted to the rock shaft 67 for biasing it in the clockwise direction noted. The upper end of the crank arms 65 and 66 are preferably secured together by an article sensing roller 73, as perhaps best seen in FIGS. 2, 4, 7 and 9. Articles moving along the conveyor engage article sensing rollers 73 and rotate the crank arms 65 and 66 in a counter clockwise direction, thus rotating rock shaft 67 as viewed in FIGS. 6, 7 and 8 also in a counter clockwise direction.

Figure 8:
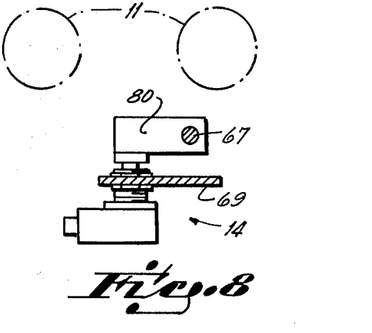
FIG. 8 is a cross-sectional view taken along lines 8—8 of FIG. 4.

At the other end of the rock shaft, opposite the spring return means 70, is located means for actuating the first air switch or valve 14. The actuating means comprises a lever arm 80, which is attached to the rock shaft 67, as shown in FIG. 8. The first air valve or switch 14 is mounted on the bracket 69, as particularly shown in FIG. 9, so that as the rock shaft 67 is moved in a counter clockwise direction, as viewed in FIG. 8, such as when article engages the sensing roller 73, the air valve or switch 14 in the zone is actuated to its second or open position to permit air to pass from conduit 18 through the valve 14 into the conduit 19.

Of course, when this occurs in zone 5, the pressurized air passes from the air compressor through conduit 18e, through air valve 14e, through conduits 19e and 20e directly to the brake apparatus 13e. When the air valves 14 of the remaining zones are actuated, such as when articles in those zones engage the respective sensing rollers, the air valve is opened to permit air from the common manifold 17 to pass through the valve 14 and into the conduit 19 to: (a) an input side of the second valve 15 in the same zone, and (b) through conduit 22 to the pneumatic valve control apparatus for the second valve 15 in the immediate upstream zone. The pressurized air in the conduit 19 in zones 1 through 4, however, is not passed through the second air valve 15 unless that valve has been moved to its open position by virtue of pressurized air in the conduit 22 extending from the immediate downstream zone.

Continuing with the description of the apparatus of a preferred embodiment of the invention, it will be noted in FIG. 9 that brackets 68 and 69 are attached to the conveyor via respective bracket members 85 and 86. Each bracket element 85 and 86 comprises a channel member to which the bracket elements 68 and 69 are respectively connected such as by a weld.

Bracket elements 85 and 86 are secured to respective mounting flats 87 and 88, and flats 87 and 88 are respectively, in turn, connected to the side channels 40 and 41 via bolts 89, 90, 91 and 92. As shown particularly in FIGS. 5 and 9, bolts 89 and 91 are secured to the respective side channels 40 and 41 in the otherwise unused slots 55. The upper bolts 90 and 92 are connected to the respective side channels via otherwise unused holes 52.

It will be appreciated that the slots 55 and holes 52, which are utilized for the bolts 89 through 92, are not used for mounting the shafts 53 of the rollers 11, 211 or the shafts 56 of the tensioning rollers 50. Rather, these holes are typically left open in the universal side channels by virtue of spacing of the rollers 11, 211 and 50 in every other hole, for example, as shown in FIG. 5. Accordingly, it will be appreciated that the standard conveyor section need not be modified for the mounting of the article sensing apparatus 12, nor for the first air valves 14, or the spring return mechanism 70. Rather the respective brackets 68, 69, 85 and 86 and flats 87 and 88 comprise bracket means which simply mount between the side channels 40 and 41 of the standard conveyor with no structural modification to the conveyor being necessary.

Figure 10:
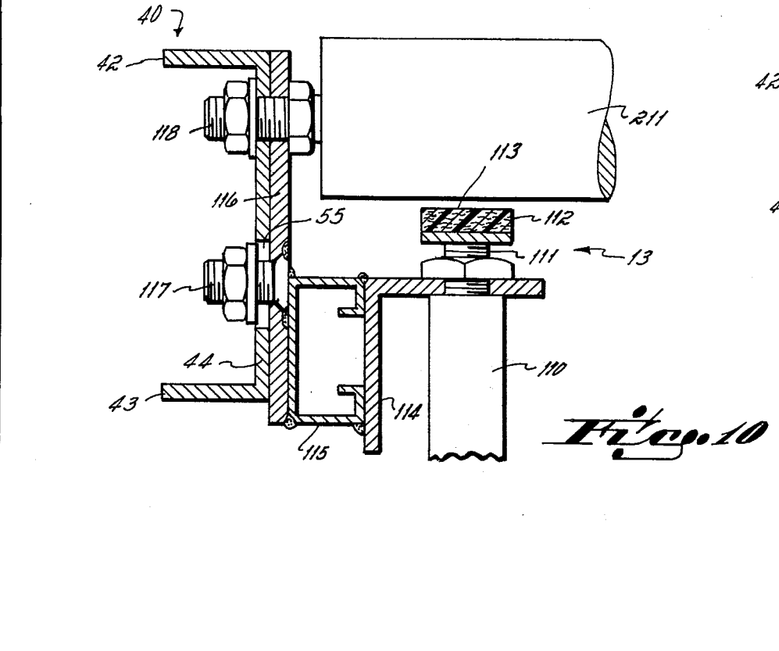
FIG. 10 is a cross-sectional view taken along lines 10—10 of FIG. 4.

Turning now to FIG. 10, the brake apparatus will be more particularly described. The brake apparatus 13 of each zone comprises an air cylinder 110, having an extendable shaft 111 mounting a brake shoe 112. As shown in FIGS. 1 through 5, the brake shoe is preferably long enough to extend beneath two rollers 211. The brake shoe is thus mounted so that when the air cylinder is actuated to extend shaft 111, the upper surface 113 of the brake shoe 112 engages the lower surfaces of two driven rollers 211. Frictional engagement of the brake shoe 112 with the rollers 211 is sufficient to stop the rollers even though the belt 21 continues to be driven. When the rollers are braked, the belt simply slides beneath the braked rollers.

The brake apparatus is also mounted to the standard conveyor section by a bracket means comprising a bracket member 114, a channel bracket member 115, and a mounting flat member 116, all as shown in FIG. 10. Similarly to the bracket means for the article sensing apparatus, the flats 116 are bolted to the side channel 40 by means of bolts 117 and 118, which extend through otherwise unused slot 55 and hole 52, respectively, in the standard conveyor section. The bracket elements 114 through 116, which form the brake apparatus mounting bracket means, are appropriately welded together as diagramatically indicated in FIG. 10.

Figure 11:
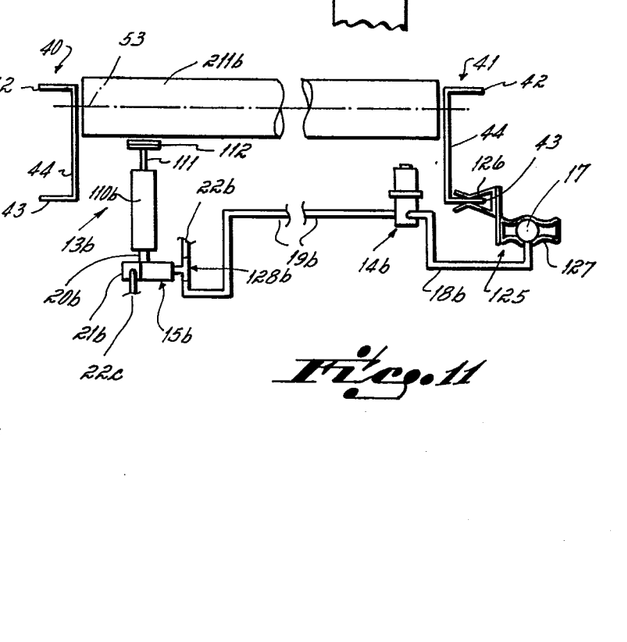
FIG. 11 is view similar to FIG. 9 but further illustrating the pneumatic control apparatus of the invention.

By way of further illustration FIG. 11 illustrates how the pneumatic control apparatus is easily connected to a standard conveyor section. FIG. 11 depicts, for illustration, features of zone 2, many of which are identical to features in the other zones. In FIG. 11 it is seen that the common manifold 17 is mounted to a conveyor side channel 41 via a caddy clip 125. The caddy clip 125 comprises a spring clip portion 126 for engaging the lower flange 43 of the conveyor's side channel 41 and a secondary spring clip portion 127 for holding the manifold 17. The caddy clip 125 is known in trade as a caddy clip or as a caddy combination conduit clamp and may be of any suitable type. One particular clip which has been found to be suitable is the caddy clip manufactured by the Erico Manufacturing Company of Ohio, the clip being designated as that company's model No. 8M-2-4-SM.

As shown in FIG. 11, the common manifold 17 is connected by appropriate conduit 18b through the first air valve 14b in each zone of the conveyor. From the air valve 14b, (when in open position) pressurized air can then be conveyed through an appropriate conduit 19b, to a T fitting 128b having one of its outlets leading into an inlet port of the second air valve 15b, (one of which is located in each zone except for zone 5). Thus, from the T fitting 128b, air is passed through the second valve 15b, and pressurized air is also introduced to the output conduit 22b, for example, for operating the control means 21a associated with valve 15a, for example, in the next upstream accumulator zone. Also shown in FIG. 11 is the input conduit 22c connected to the control apparatus 21b of the second air valve 15b, from downstream T-fitting 128c. Once this conduit is pressurized, the control apparatus of the second air valve 15b actuates the air valve to an open position such that the valve is in a condition to pass air from the T fitting 128b through the valve and into the air cylinder 110b for actuating the brake shoe 112b against the rollers to be braked in the respective zone.

Of course, it should be noted that with respect to the overall accumulator conveyor 10, only the air valves 15b, 15c and 15d are provided with the T fittings 128. The air valve 15a in zone 1 does not require a T fitting since it is the upstream most zone. In zone 5, a T fitting 128 is utilized, however, one output is connected directly to cylinder 110e (no valve 15 being utilized) and another output to conduit 22e.

From the foregoing then, it can be appreciated that all that is necessary to provide a standard conveyor section with a zero pressure accumulating capability is the mounting of the article sensing apparatus 12, the braking apparatus 13, and the two air valves 14 and 15 in the respective zones as described above. These mountings are accomplished via appropriate brackets which are simply bolted to the existing standard conveyor. In the case of manifold 17, it is attached to the conveyor by means of appropriate clips while the remaining conduits are connected as described and attached, if necessary, to the conveyor for support by any suitable means. These connections can be simply accomplished and it is not necessary to significantly modify the structural components of the standard conveyor in order to provide the zero pressure accumulator conveyor 10. Valves or switches 15 can be mounted in any suitable manner, such as by a rigid conduit connector directly to cylinder 110 as illustrated in FIG. 11.

In order to more particularly describe a preferred embodiment of the conveyor, the first air switch or air valve 14 comprises a "Tiny Tim Air Switch," which is a push button actuated valve, Model No. 3C4P-VS, a product of Mosier Industries, Inc. of Dayton, Ohio. This valve is a normally closed valve, in which closed position the valve blocks any passage of pressurized air from conduit 18 to conduit 19. Also, in the closed position, this valve opens or vents conduit 19. Thus, when valve 14 is closed, conduits 19 and 22 are vented, permitting the upstream valve 15 to return or to stay in its normally closed position. The second air valve or air switch 15 is a "Tiny Tim Air Switch," Model No. 3C5, also a product of the Mosier Industries, Inc. of Dayton, Ohio. This particular valve is a valve of the type having an inlet and an outlet for air throughput, and a second valve control inlet which can be pressurized in order to actuate the valve from a closed to an open position in order to pass pressurized air from the air inlet to the air outlet, as described above. When conduit 22 is not pressurized, however, or when upstream valve 14 is closed, venting conduit 22, valve 15 is normally closed under the bias of spring 23. Valve 15 is also constructed so that when closed, conduit 20 is vented (in the respective zone) to release pressure in brake cylinder 110 and to permit the brake to release. Finally, the spring return air cylinder 110 comprises a Bimba Model Q41 air cylinder, having a three-quarter inch diameter bore and a one inch pneumatically actuated stroke. A spring return mechanism 109 returns the shaft 111 to a withdrawn position upon venting of the cylinder. This cylinder is provided by the Bimba Corporation of Chicago, Ill. Of course, any suitable valves and cylinders could be used without departing from the scope of the invention.

Operation

Having described the apparatus in detail, the operation thereof is best seen in FIGS. 1 through 3. In FIG. 1, an article A is shown being conveyed through zone 3. In this condition, none of the valves 15a through 15d are moved to their open position, but rather are closed. As the article A engages the article sensing apparatus 12 in each zone, the respective valve 14 is moved to an open position. This passes pressurized air through the conduit 18, through the valve 14 and into the conduit 19. The brakes in the zones, however, are not actuated since the valves 15 have not been energized, or charged, as a result of pressurized air in the conduits 22. Thus, the valves 15 are in a closed position, and when the article A engages the article sensing apparatus 12, the brakes are not energized. Thus, in the condition shown in FIG. 1, the conveyor 10 simply operates like a belt driven live roller conveyor, where a common drive belt 51 is tensioned by tensioning rollers 50, against the article carrying rollers 11 throughout the conveyor.

FIG. 2 illustrates the accumulator conveyor 10 operating in an accumulate mode where articles A, B and C have moved into zones 5, 4 and 3 and where an article D is moving into zone 2, but has not been yet sensed therein. It should be appreciated, of course, that FIGS. 1, 2 and 3 are arranged on the drawing so that the position of each accumulating zone in FIGS. 2 and 3 are in the same corresponding positions as shown in FIG. 1.

In FIG. 2, article A has been conveyed to zone 5 and has been stopped there, at least momentarily. Article A is stopped in zone 5 by means of the brake apparatus 13e, actuated directly by valve 14e when the article is sensed by sensing apparatus 12e. Once article A is stopped in zone 5, the immediate upstream zone is conditioned to accumulate when article B arrives therein and is sensed. Article A will remain stopped in zone 5, and zone 4 will remain in condition for braking article B until such time as is removed from zone 5 by any means (not shown) such as mechanically or manually. Alternately, additional control means could be supplied to close valve 14e, to vent conduits 19e and 20e, and to release brake 13e. For whatever reason, however, the Article A is stopped at the output end of zone 5 of the conveyor 10 when operated in a normal accumulate mode.

In this position, the article sensing apparatus 12e is depressed to open the valve 14e and thereby pass pressurized air from the common manifold 17 and conduit 18e, through the valve 14e and into the conduit 19e. The conduit 19e is connected directly to the conduit 20e and is thus effective to energize the cylinder 110e and cause the brake shoe 112e to engage two rollers 211e and thereby stop the article A in zone 5. It should also be noted at this point that article A is supported by the two braked rollers 211e and also by two additional rollers 11e, which are immediately downstream of the two braked rollers. As previously described, all of the rollers 11e and 211e in the zone are driven. Thus, it will be seen that of the two rearward more rollers 211e beneath the article are positively braked and the drive belt 51 slides thereunder. The two forward-most rollers 11e in the zone continue to receive driving force from the belt 51. The positive stoppage, however, of the braked rollers 211e is sufficient to stop the article A in the zone even through the article also rests on the other rollers 11e, which are not positively braked.

In a preferred condition, the tensioning rollers 50 are adjusted against the belt 51 so that while the belt exerts enough force on the rollers to drive them in normal circumstances, the resting of the braked article A on the rollers 11e serves to stop them against the drive of the belt. Thus, in a preferred condition, all of the rollers beneath the article are either positively braked by the brake apparatus 13e or the remaining non-braked rollers are simply braked by the stopped article resting thereon. Even should the belt tension be sufficiently great to overcome the force exerted on the non-braked rollers by the article, so they continue to turn, the positive braking of the two rollers in zone 5 is sufficient to stop the articles.

The opening of the valve 14e also passes pressurized air through the conduit 19e into the conduit 22e and thus into the control apparatus 21d of the valve 15d in the next immediate upstream zone 4. The pressurizing of conduit 22e actuates the control 21d to move valve 15d into an open position. Thereby, when the article B was conveyed into zone 4 and engaged the article sensing apparatus 12d, the valve 14d was opened and pressurized air passed through conduit 18d, through the valve 14d, and into conduit 19d. From conduit 19d, pressurized air was introduced through valve 15d, then in an open condition, into conduit 20d, and thereby energized the cylinder 110d and caused the brake shoe 112d to positively brake the rollers 211d beneath the rearward end of the article B. The sensing of the article B in zone 4 and the opening of valve 14d was also operable to pressurize, through the conduit 19d and the T fitting 128d, the conduit 22d which actuages or charges the next upstream most valve 15c into an open condition.

Accordingly, the article C is likewise stopped in zone 3 wherein the article sensing apparatus 12c is depressed to open the valve 14c and thereby pressurized conduits 19c, and 22c and to operate the control apparatus 21b of the next upstream valve 15b in zone 2. It will be noted, however, that the article sensing apparatus 12b is still in a non-actuated state since the article D has not reached the sensing apparatus 12b. Accordingly, the first valve 14b is not yet opened, and even though pressure is available in manifold 17, and in conduit 18b, the valve 14b is closed and conduit 19b is not pressurized. Thus, the cylinder 110b is not actuated and no rollers in zone 2 are positively braked.

It will also be noted that since valve 14b is still in a closed position, conduit 22b is also not pressurized and the next upstream most valve 15a remains in a closed position.

FIG. 3 illustrates the accumulator conveyor 10 as in FIG. 2, with two exceptions. First, article D has now been conveyed over the article sensing apparatus 12b to cause that apparatus to open valve 14b and thereby permit pressurized air from conduit 18b to flow into conduit 19b to the T fitting 128b. Since article C in zone 3 has opened valve 14c in that zone, the valve 15b in zone 2 is now opened. Since valve 14b is now opened, pressurized air from manifold 17 has passed through the conduit 18b, valve 14b, conduit 19b, and through valve 15b and into conduit 20b to energize the cylinder 110b and to cause the brake shoe 112b to positively brake the rollers 211b and thereby stop article D in zone 2. In this condition, and since the sensing apparatus 12b has opened valve 14b, it will be appreciated that the pressurized air is also introduced into conduit 22b, thereby opening the valve 15a in the immediate upstream zone 1 and conditioning that zone to receive any further articles and to stop them.

Secondly, in FIG. 3, article A has been removed from zone 5, thus releasing the sensing apparatus 12e, and closing valve 14e. This has the effect of venting conduits 19e and 20e to release the pressure in cylinder 110e and thus release the brake 13e. Also, this has the effect of venting conduit 22e which causes spring 23d to move valve 15d in zone 4 to its closed position. This has the effect of venting conduit 20d and thus releases brake 13d in zone 4, permitting article B to be conveyed into zone 5. As soon as article B clears sensing apparatus 12d, valve 14d closes, and conduits 19d and 22d are vented through valve 14d to release the brake 13c in a similar manner.

From this description it will be appreciated that articles are accumulated in any zone only when a preceding zone is braked. Thus, articles are accumulated in response to the presence of a sensed article in the immediate downstream zone and the presence of an article in the zone to be braked.

It should also be noted that, for example, in the case of FIG. 1 should article A engage the article sensing apparatus 12c, the valve 14c would be operated and would result in pressurization of conduit 22c to open the valve 15b in upstream zone 2. Should another article be conveyed onto zone 2 such that it would engage the article sensing apparatus 12b at this time, it would be possible that the brake of zone 2 would be actuated to stop the article in zone 2 until article A cleared the downstream sensing apparatus 12c in zone 3. As soon as article A cleared the apparatus 12c, however, valve 14c would again be closed, conduit 22c would no longer remain pressurized, but would be vented through valve 14c, and the valve 15b would close, thereby permitting the spring return mechanism 109 of the brake cylinder 110 in zone 2 to disengage the brake from the rollers 211b thereby conveying any following article out of zone 2 and into zone 3.

It should also be appreciated that the apparatus described herein provides zero pressure accumulation, as shown in FIGS. 1 through 3 where the articles are accumulated without engaging each other, but rather independently in each zone. Moreover, and according to the just described operation where articles following other articles too closely are momentarily stopped, it will be appreciated that the accumulator conveyor 10 is operable to singulate or to space articles thereon, this being advantageous to downstream handling and to the provision of zero pressure accumulation.

It will further be appreciated that the apparatus could be modified to brake only one or to brake more than two rollers in particular zone as may be necessary for a particular operation. In accordance with the invention, however, less than all rollers in a zone are braked, it being unnecessary to brake them all. In this regard, it will be appreciated that the availability of adjusting the tension exerted by the belt 51 on article carrying rollers 11 is highly advantageous to the operation of the accumulator conveyor as described. This is due to the fact that in view of various weights and sizes of articles, the tensioning rollers can be adjusted to permit the article carrying rollers to normally drive the articles and yet permit them to stop, even though they may not be positively braked, when an article is stopped in a particular zone by the positively braked rollers.

These and other modifications will be readily appreciated without departing from the scope of this invention and accordingly the applicant intends to be bound only by the claims appended hereto.

I claim:

1. A zero pressure accumulator conveyor of the type comprising a plurality of accumulation zones for conveying and accumulating articles, said conveyor comprising:

a plurality of driven article conveying rollers in each zone, a common drive belt engaging and driving the driven rollers in a zone, brake means in each zone for selectively engaging at least one driven roller in each zone for braking said one roller to stop an article in said zone, said brake means in a downstreammost zone operating in response to an article sensed in said downstreammost zone, and said brake means in other upstream zones operating in response to both an article sensed in an immediate downstream zone and a different article sensed in the zone to be braked, said drive belt continually directly engaging all driven rollers in a braked zone and, during operation of said brake means, said drive belt continually and directly engaging all such driven rollers throughout the width of the belt and sliding against said braked roller, the frictional forces thereon being insufficient to drive at least said braked roller.

2. An accumulator conveyor as in claim 1 where two driven rollers in each zone are selectively engaged and braked by said brake means.

3. An accumulator conveyor as in claim 1 wherein said brake means comprises an air cylinder actuated brake shoe disposed to engage said braked roller when said air cylinder is actuated.

4. An accumulator conveyor as in claim 3 including an article sensing lever arm in the zone to be braked and disposed in the path of articles conveyed through said zone, said arm operatively connected to first valve means for actuating said air cylinder when an article is sensed by movement of said lever arm in said zone, and including means, in zones other than the downstreammost zone, for supplying compressed air to said cylinder through said valve means in response to the presence of an article accumulated in an immediately downstream zone.

5. An accumulator conveyor as in claim 4 wherein said supply means comprises a second air valve means movable to an open position, in response to the sensing of an article in an immediate downstream zone, to pass pressurized air from said first valve means in said zone to be braked to said air cylinder in said zone to be braked.

6. An accumulator conveyor as in claim 5 wherein said second valve means is normally closed and normally blocks pressurized air from said first valve means to said cylinder in the absence of a sensed article in a downstream zone.

7. An accumulator conveyor as in claim 6 wherein said conveyor is a belt driven live roller conveyor of the type including a drive belt beneath article carrying rollers and tension rollers for holding said belt in engagement with the article carrying rollers, said accumulator conveyor further including bracket means pivotally mounting said lever arm, said bracket means mounted on side channels of said conveyor.

8. An accumulator conveyor as in claim 7 wherein said lever arm comprises at least one bell crank having one end operatively disposed in said article path and another end mounted on a pivot shaft pivotally secured between said bracket means.

9. An accumulator conveyor as in claim 8 wherein elongated side channels of said conveyor have pre-punched holes therein for mounting article carrying and belt tensioning roller shafts, less than all holes being used therefor, and said bracket means being bolted to said side frames through at least one opposite hole in each said respective channel, said hole pre-punched for said shafts, but not used therefor.

10. An accumulator conveyor as in claim 9 wherein said brake means is bolted to said elongated conveyor side channels through at least one hole pre-punched in a channel for said shafts.

11. An accumulator conveyor as in claim 10 wherein said bracket means and said brake means are bolted to said respective conveyor side channels through at least holes pre-punched for shafts of said tensioning rollers.

12. An accumulator conveyor as in claim 6 wherein said lever arm is operatively connected to said first valve means, said valve means being mounted on said bracket means proximate one side channel of said conveyor.

13. An accumulator conveyor as in claim 4 further including, a common air supply manifold extending along said accumulation zones, means connecting said manifold to said first air valve means in each zone, a second valve means in each upstream zone, conduit means connecting an output of said first valve means to an input of said second valve means in the respective zones, and to means for controlling the second valve means in an immediate upstream zone, said first valve means opening to pass cylinder actuating pressurized air to the input of said second valve means and to pass controlling pressurized air to the second valve means in an upstream zone to open said second valve means therein, all in response to the sensing an article in the first valve means' associated zone, and said second valve means being actuated to pass said cylinder actuating pressure air to said cylinder only in response to the sensing of an article in an immediate downstream zone and the consequent actuation of said first valve means in said downstream zone by said article therein.

14. An accumulator conveyor of the type having a plurality of accumulator zones, each zone comprising a plurality of article carrying rollers frictionally engaged directly by and driven by a common drive belt biased against said rollers, said conveyor further comprising, in each zone,
  a brake shoe disposed to engage at least one driven carrying roller in the zone,
  an air cylinder operatively mounted proximate said one roller and mounting said brake shoe for selective engagement with said roller,
  means for sensing an article in said zone,
  a first air valve actuable by said sensing means to pass pressurized air therethrough when said valve is actuated by said sensing means, and
  a common source of pressurized air connected to an input of said first valve, said conveyor in all but a downstream-most zone including
  a second air valve operatively connected to pass pressurized air to said air cylinder to brake said one roller when said second valve is actuated to an open position,
and said conveyor further comprising
  means operatively connecting an output of said first air valve to said second air valve in the same zone for actuating said cylinder to brake said one roller in said zone when said second air valve in the same zone is in an open position, and to the second air valve in an immediate upstream zone for actuating it to an open position permitting actuation of the air cylinder in the upstream zone when an article is sensed in said upstream zone,
  whereby an article in said upstream zone is accumulated only when an article is sensed in the immediate downstream zone, and whereby said one brake roller stops the article in the zone while the drive belt continues to exert frictional driving forces on all normally driven rollers in the zone, said belt continually directly engaging all said rollers during braking and being continually biased against said rollers.

15. Apparatus for converting a belt driven live roller conveyor, having a plurality of article carrying rollers engaged and driven by a common drive belt and tensioning rollers holding said belt directly against said carrying rollers, into a zero pressure accumulator conveyor having a plurality of accumulation zones, each zone including a portion of said driven rollers, said apparatus including:
  brake means for each zone for braking at least one article carrying roller in each zone, said brake means including a brake shoe and a brake shoe operating air cylinder;
  bracket means for mounting a brake means on each zone of said conveyor in operative disposition proximate at least one belt driven roller;
  article sensing means for sensing a conveyed article in each zone;
  bracket means mounting a sensing means on said conveyor in each zone;
  a pressurized air source connected to a pressurized air manifold;
  a first air valve operably connected to said manifold, for each zone, said air valve being normally closed but operable to an open position to pass pressurized air from said manifold in response to actuation of said sensing means;
  a second air valve for each zone upstream of a downstream-most zone, said second air valve normally closed but actuable to an open position to pass pressurized air from said opened first air valve in the respective zone to said air cylinder in the respective zone; and
  means connecting an output of the first air valve in a downstream zone to the second air valve in an immediate upstream zone to actuate said second air valve to open in response to opening of the first air valve in the downstream zones,
  said belt continually engaging said article carrying rollers, during braking, throughout its width.

16. Apparatus as in claim 15 wherein said belt driven live roller conveyor includes side frame channels having pre-punched holes for mounting shafts of said article carrying rollers, and pre-punched slots for adjustably mounting shafts of belt tensioning rollers; and
  said brackets including fasteners selectively mounting to said conveyor through respective holes and slots not used for mounting said shafts.

17. Apparatus as in claim 15 wherein said brake means mounting bracket means includes a flat element having holes for bolting to a side channel of said conveyor, a channel element attached to said flat element, and an angle element attached to said channel bracket, said air cylinder attached to said angle element.

18. Apparatus as in claim 15 wherein said bracket means mounting said sensing means comprises: a flat element on each side of said conveyor and having holes for bolting to said side channels, a channel element attached to each flat element, and an angle element attached to each channel element, said angle element adapted for mounting a rock shaft of said sensing means.

19. Apparatus as in claim 15 wherein said sensing apparatus comprises a lever arm having one end extending into a path traversed by articles conveyed on said conveyor, and having another end connected to a rock shaft.

20. Apparatus as in claim 19 wherein said rock shaft is operably connected to said first air valve.

21. Apparatus as in claim 15 in combination with means for moving said tensioning rollers and adjusting the pressure of said drive belt on said article carrying rollers to a degree such that non-braked rollers cease turning, when an article thereon is stopped, and during continued operation of said drive belt.

22. A zero pressure accumulator conveyor for conveying articles and comprising
  at least two conveyor accumulation zones, each zone including a plurality of article carrying rollers driven by a common drive belt directly engaging surfaces of said rollers, and
  brake means associated with each zone for braking at least one roller in each zone,
  said brake means, when actuated, engaging said one roller and holding same against rotation by the common belt drive, and other rollers in each zone remaining free of engagement by said brake means when said brake means is actuated, whereby said article is held in said zone by said braked roller, and whereby said common drive belt continues to directly engage and slide against said braked rollers throughout the width of the belt.

23. A method of accumulating articles in spaced disposition on a conveyor of the type having a plurality of accumulation zones, each of said zones including a plurality of frictionally driven article conveying rollers, said method comprising the steps of:
  frictionally directly engaging and driving rollers in said zones with a common belt drive means throughout the width of said belt means, sensing an article in one zone,
sensing a second article in an immediate upstream zone;
braking, in response to both said sensing steps, at least one driven roller in said upstream zone, said braked roller engaging said article, thereby stopping said article in said upstream zone, and during said braking, directly exerting a frictional driving force on all rollers in both zones throughout the width of said belt, whereby all rollers in said zone are frictionally urged to rotate and to convey said article through said zone, said frictional driving force being insufficient to convey said article past said one braked roller.

24. Apparatus for converting a belt driven live roller conveyor, having a plurality of article carrying rollers driven by a common drive belt and tensioning rollers holding said belt against said carrying rollers, into a zero pressure accumulator conveyor having a plurality of accumulation zones, each zone including a portion of said driven rollers, said apparatus including:
at least one article sensing means and mounting means therefor;
at least one brake means and mounting means therefor; and
means operatively interconnecting said sensing means and said brake means,
said article sensing means including a sensing roller, a rock shaft connected to said roller, brackets for mounting ends of said rock shaft to respective sides of said conveyor, an arm on said rock shaft at one end, a sensing valve mounted on one of said brackets in position for operation by said arm, another arm mounted at another end of said rock shaft, and spring means operatively connected thereto for urging said rock shaft in one direction,
said brake means including a brake shoe, a fluid cylinder for actuating said brake shoe, a bracket for mounting said air cylinder to one side of said conveyor, and a second fluid valve for controlling said cylinder,
said means operatively interconnecting said sensing means and said brake means comprising conduits interconnecting said valves and said cylinder for selectively operating said brake means when said apparatus is connected to a belt driven live roller conveyor.

25. Apparatus as in claim 24 including a plurality of sensing means and brake means for plural accumulating zones in said conveyor, and further including:
a pressurized fluid manifold;
said sensing valves operably connected to said manifold, said sensing valves being normally closed but operable to an open position to pass pressurized fluid from said manifold in response to actuation of said sensing means;
said second valve normally closed but actuable to an open position to pass pressurized fluid from said opened first valve in the respective zone to said air cylinder in the respective zone; and
means connecting an output of the first valve in a downstream zone to the second valve in an immediate upstream zone to actuate said second valve to open in response to opening of the first valve in the downstream zones.

26. Apparatus as in claim 24 wherein said interconnecting means includes a common fluid pressure manifold and bracket means for connecting said manifold to a conveyor.

* * * * *

UNITED STATES PATENT AND TRADEMARK OFFICE
CERTIFICATE OF CORRECTION

PATENT NO. : 4,174,777
DATED : November 20, 1979
INVENTOR(S) : Frederick W. Riehle It is certified that error appears in the above-identified patent and that said Letters Patent are hereby corrected as shown below:

| | | | |
|---|---|---|---|
| Col. 2, Line 65 | "machanism" | should be | --mechanism-- |
| Col. 4, Line 9 | "Sincce" | should be | --Since-- |
| Col. 6, Line 18 | "prepunched" | should be | --pre-punched-- |
| Col. 6, Line 50 | "prepunched" | should be | --pre-punched-- |
| Col. 8, Line 26 | "thebrake" | should be | --the brake-- |
| Col. 11, Line 6 | "11e" | the numeral eleven should be in bold print | |

Signed and Sealed this

First Day of April 1980

[SEAL]

Attest:

Attesting Officer

SIDNEY A. DIAMOND

Commissioner of Patents and Trademarks